INVENTOR
JOHN E. RYMES
By- Smart & Biggar
ATTORNEYS.

United States Patent Office 3,386,778
Patented June 4, 1968

3,386,778
WALKING BEAM SUSPENSION
John E. Rymes, Calgary, Alberta, Canada, assignor to Robin-Nodwell Mfg. Ltd., Calgary, Alberta, Canada
Filed July 1, 1965, Ser. No. 468,817
1 Claim. (Cl. 305—27)

The present invention relates to tracked vehicles. In particular the present invention relates to a suspension system in a tracked vehicle in which the load carrying wheels are spring biased so as to be in constant contact with the inside surface of the lower run of the or each track whereby to maintain a constant track pressure at all times on the surface of the terrain over which the vehicle passes.

A constant track pressure on the surface of the terrain over which the vehicle passes facilitates the obtention of friction between the lower surface of the lower run of the track and the surface of the terrain and as such the tendency of skidding or sliding between the track or tracks of the vehicle and the surface of the terrain is substantially reduced. Such a vehicle is thus more readily usable for travelling over any type of terrain such as flat country and rough country, e.g. fields, woods, as well as slippery surfaces such as ice and snow. Besides being able to travel over such country, such a vehicle also has been found to readily absorb shocks and unevenness in the surface of the ground without unduly jolting and bumping the passengers.

The present invention provides a suspension system for a tracked vehicle in which each load carrying wheel of the suspension is individually and independently mounted and maintained in constant contact with the inside surface of the track by individual and independent spring means whereby to obtain optimum flexibility in the suspension system particularly transversely of the chassis and accommodate all possible variations in the surface of the terrain over which the vehicle passes and maintains constant track pressure at all times on the surface of the terrain over which the vehicle passes.

According to the present invention, there is provided a suspension for a tracked vehicle having a chassis with a track mounted therebeneath, which suspension includes a transversely extending rod means rigidly connected to said chassis; a plurality of sleeves coaxially and rotatably mounted side by side on said rod means; a crank arm on each sleeve extending downwardly and outwardly from the sleeve; a load carrying wheel operatively mounted on each crank arm; and individual suspension spring means for each wheel anchored to said rod means and acting to individually and independently bias each wheel into contact with the inside surface of the lower run of the track; said load carrying wheels extending alternately fore and aft from adjacent sleeves.

A tracked vehicle to which the suspension of the present invention is particularly applicable is a light-weight vehicle of small size and in this respect a particularly suitable vehicle is one equipped with rear track(s) and front skis by which the vehicle may be steered, the skis being desirably easily removable to reduce the dimensions of the vehicle for transportation by air or for confined spaces. It is particularly desirable that the skis are attached to the steering of the vehicle.

The suspension system in the tracked vehicle of the present invention applies to vehicles having a single track or a plurality of tracks and is particularly advantageous in the single track vehicle.

The invention will be further illustrated by way of the accompanying drawings in which.

Figure 3:
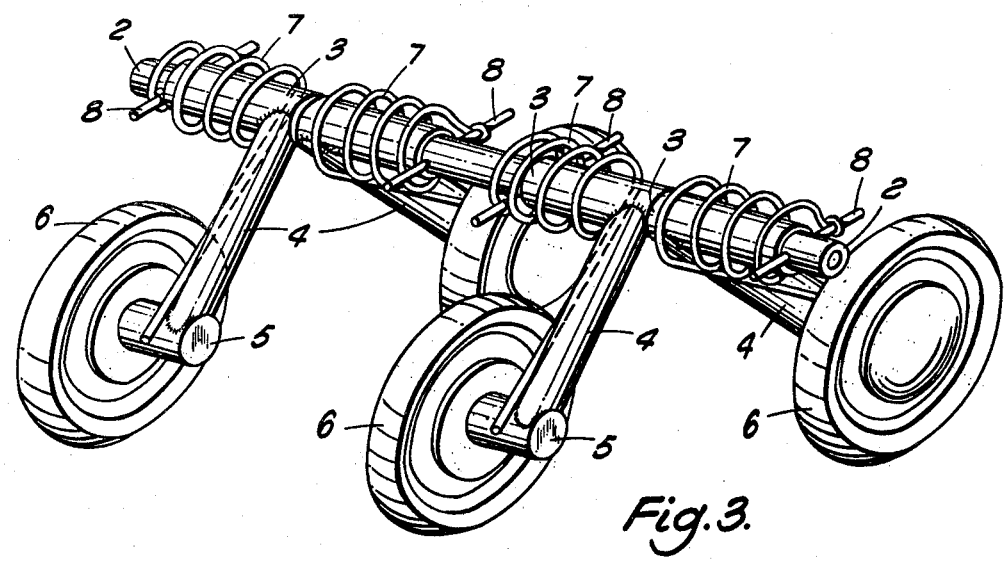
FIGURE 3 is a perspective view of the mounting in the suspension system of FIGURE 1 of the load carrying wheels.
Figure 1:
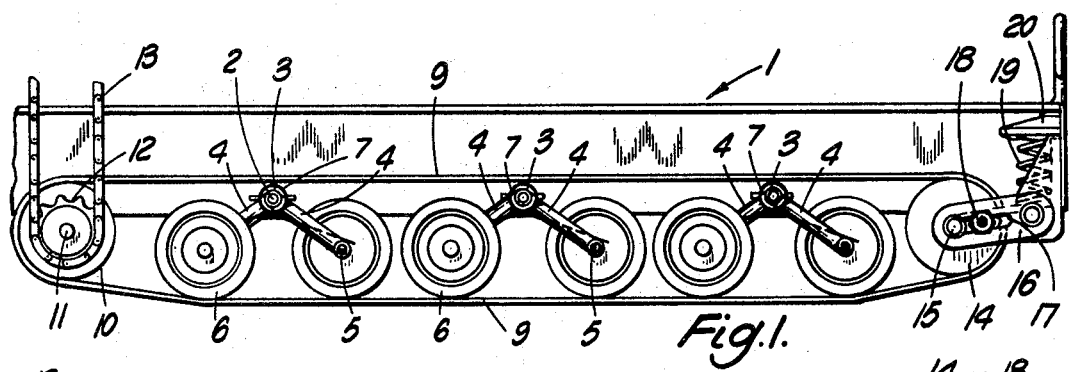
FIGURE 1 is a side elevation of a suspension system on a tracked vehicle according to one embodiment of the present invention.
Figure 2:
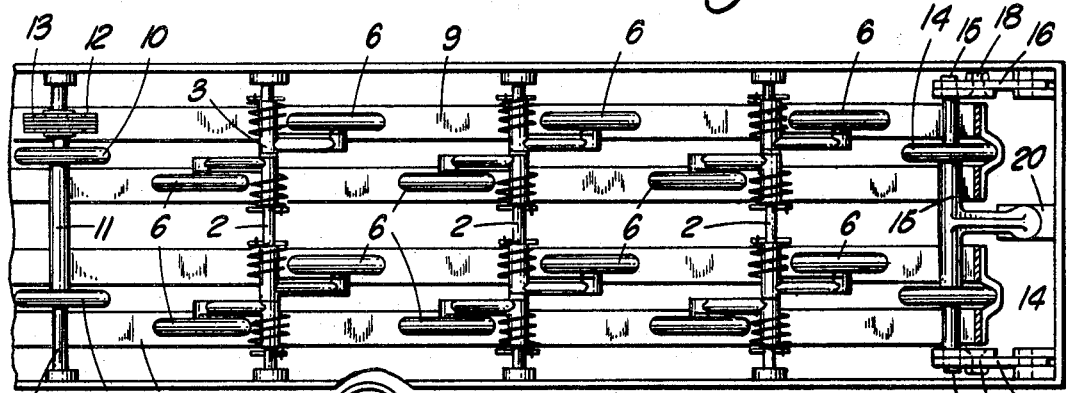
FIGURE 2 is a plan view of the suspension system of FIGURE 1.
Figure 4:
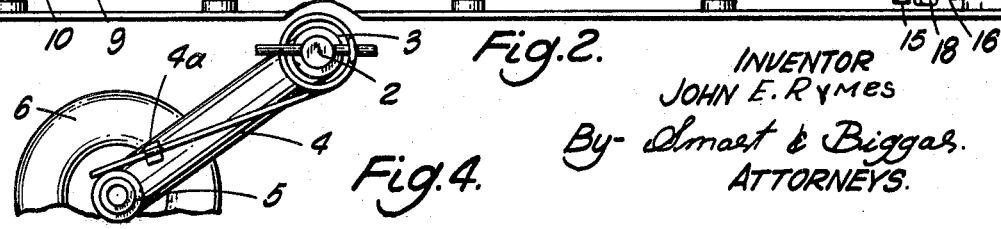
FIGURE 4 is a detail of the mounting of the load carrying wheels in FIGURE 3.

With reference to the figures, the tracked vehicle includes a chassis 1 having rods 2 extending thereacross and rigidly mounted thereon. Each rod 2 has coaxially rotatably mounted thereon a plurality of a sleeves 3 each sleeve 3 carrying an arm 4 on the opposite end of which is a stub axle 5 for the load carrying wheel 6.

Disposed around each sleeve 3 is a helical spring 7, one end of which is connected to a pin 8 on the rod 2 and the other end of which abuts the stub axle 5 carrying the wheel 6 and is held by a spring clip 4a in the arm 4. Each helical spring 7 thus urges its associated load carrying wheel 6 into contact with the lower run of endless track 9 passing beneath said load carrying wheels 6, the springs 7 being so disposed that alternate load carrying wheels 6 on each rod 2 contact the lower run of the track 9 on opposite sides of said rod. It will be seen that the load carrying wheels 6 on either side of each rod 2 are staggered.

Forwards of the load carrying wheels 6 are driving wheels 10 for said track 9, said driving wheels 10 being mounted on an axle 11 extending across said chassis 1 and being rotatably mounted thereon. The axle 11 also carries a sprocket 12 around which there extends a chain 13 from a drive motor (not shown) such as an internal combustion engine.

Rearwards of the load carrying wheels 6 are tensioning idler wheels 14 mounted on an axle 15 which in turn extends between a pair of arms 16 pivotably mounted on said chassis 1. The axle 15 is slideably mounted in slots 17 in the arms 16 and is releasably lockable in any desired position by means of locking units 18. In order to adjust the tension in the track 9 the locking units 18 are loosened and the axle 15 is pushed along the slot 17 such as by a hydraulic jack whence any slack in the track 9 is taken up and the units 18 are then tightened. The arm 16 is maintained in position by a compression spring 19 extending from a bracket 20 which absorbs any shocks received by said arm.

It will be seen that by individually and independently mounting and spring biasing each load carrying wheel 6 into continuous contact with the lower run of the track 9 and with the preferred feature that the load carrying wheels 6 are generally out of alignment with each other it is possible to maintain a constant track pressure between the track 9 over the whole surface thereof and the terrain over which the vehicle is passing and as such obtain a good friction between the lower surface of the lower run of the track 9 and the surface of the terrain. Further it will be seen that maximum flexibility is achieved in the load carrying wheels 6 transversely of the chassis 1 and again if one of the springs 7 fails only one load carrying wheel 6 will be rendered ineffective which will have small if any effect on the efficiency of the vehicle.

What I claim as my invention is:

1. A suspension for a tracked vehicle having a chassis with a track mounted therebeneath, which system includes a plurality of transversely extending rod means rigidly connected to said chassis and spaced longitudinally thereof; a set of wheels mounted on each rod means, each set comprising a plurality of sleeves coaxially and rotatably mounted side by side on said rod means; a crank arm mounted on each sleeve extending downwardly and outwardly therefrom; a load carrying wheel mounted on the free end of each crank arm; an individual coil spring for each wheel surrounding the wheel carrying sleeve with one spring end being anchored to the rod means which carries that sleeve and the other spring end biasing its wheel downwardly into contact with the inside surface of the lower run of the track, the wheels of each set extending alternately fore and aft from adjacent sleeves.

References Cited

UNITED STATES PATENTS

| | | | |
|---|---|---|---|
| 2,609,212 | 9/1952 | McMurtrie | 280—33.2 |
| 2,355,266 | 8/1944 | Bombardier | 305—23 X |
| 2,863,657 | 12/1958 | Altherr | 267—58 |
| 3,023,824 | 3/1962 | Bombardier | 305—27 |
| 3,237,961 | 3/1966 | McMullen | 267—58 X |
| 3,309,150 | 3/1967 | Marier | 305—27 |

FOREIGN PATENTS 521,753   5/1940   Great Britain.

RICHARD J. JOHNSON, *Primary Examiner.*